US011102697B2

(12) United States Patent
Gong et al.

(10) Patent No.: US 11,102,697 B2
(45) Date of Patent: Aug. 24, 2021

(54) METHOD FOR CONTROLLING EARPHONE SWITCHING AND EARPHONE

(71) Applicant: Guangdong Oppo Mobile Telecommunications Corp., Ltd., Guangdong (CN)

(72) Inventors: Jinhua Gong, Guangdong (CN); Baoti Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 55 days.

(21) Appl. No.: 16/459,231

(22) Filed: Jul. 1, 2019

(65) Prior Publication Data

US 2020/0008124 A1 Jan. 2, 2020

(30) Foreign Application Priority Data

Jul. 2, 2018 (CN) .......................... 201810710118.1

(51) Int. Cl.
*H04W 40/10* (2009.01)
*H04R 1/10* (2006.01)
(Continued)

(52) U.S. Cl.
CPC .......... *H04W 40/10* (2013.01); *H04R 1/1041* (2013.01); *H04W 40/005* (2013.01); *H04W 52/0264* (2013.01); *H04W 52/0296* (2013.01)

(58) Field of Classification Search
CPC .... H04M 1/6033; H04M 1/03; H04M 1/6058; H04M 1/6041; H04W 84/20; H04W 92/18; H04W 52/02; H04W 52/288
See application file for complete search history.

(56) References Cited

U.S. PATENT DOCUMENTS 10,129,626 B1 * 11/2018 Jung ...................... H02J 7/342
2009/0164152 A1 6/2009 Creus et al.
(Continued)

FOREIGN PATENT DOCUMENTS

CN 104635908 A 5/2015
CN 104780269 A 7/2015
(Continued)

OTHER PUBLICATIONS

English translation of Office Action 1 issued in corresponding Chinese application No. 201810710118.1 dated May 18, 2020.
(Continued)

*Primary Examiner* — Asad M Nawaz
*Assistant Examiner* — Najeeb Ansari
(74) *Attorney, Agent, or Firm* — Young Basile Hanlon & MacFarlane, P.C.

(57) ABSTRACT

A method for controlling earphone switching and an earphone are provided. The method includes the following. A first earphone acquires a first remaining power and a first operating parameter of the first earphone and a second remaining power and a second operating parameter of a second earphone. The second earphone serves as a slave earphone. The first earphone predicts a first battery life of the first earphone according to the first remaining power and the first operating parameter and a second battery life of the second earphone according to the second remaining power and the second operating parameter. The first earphone predicts switches the second earphone to serve as a master earphone and the first earphone to serve as a slave earphone, when a difference between the second battery life and the first battery life is greater than a first preset threshold.

17 Claims, 7 Drawing Sheets

(51) Int. Cl.
*H04W 40/00* (2009.01)
*H04W 52/02* (2009.01)

(56) References Cited

U.S. PATENT DOCUMENTS

| | | | | |
|---|---|---|---|---|
| 2011/0286615 A1* | 11/2011 | Olodort | ............ | H04R 1/1025 |
| | | | | 381/311 |
| 2012/0230510 A1* | 9/2012 | Dinescu | ............ | H04R 5/033 |
| | | | | 381/80 |
| 2013/0316642 A1* | 11/2013 | Newham | ............ | H04R 1/1091 |
| | | | | 455/11.1 |
| 2017/0164089 A1 | 6/2017 | Lee et al. | | |
| 2017/0264987 A1 | 9/2017 | Hong et al. | | |
| 2018/0103321 A1 | 4/2018 | Seo et al. | | |

FOREIGN PATENT DOCUMENTS

| | | |
|---|---|---|
| CN | 104796518 A | 7/2015 |
| CN | 204539449 U | 8/2015 |
| CN | 205961391 U | 2/2017 |
| CN | 106937197 A | 7/2017 |
| CN | 206350153 U | 7/2017 |
| CN | 107071615 A | 8/2017 |
| CN | 107071618 A | 8/2017 |
| CN | 107145330 A | 9/2017 |
| CN | 107708014 A | 2/2018 |
| CN | 107820155 A | 3/2018 |
| CN | 107894881 A | 4/2018 |
| CN | 207560293 U | 6/2018 |
| WO | 2012167234 A1 | 12/2012 |

OTHER PUBLICATIONS

Extended European search report issued in corresponding European application No. 19183541.2 dated Nov. 27, 2019.
International search report issued in corresponding international application No. PCT/CN2019/093113 dated Sep. 27, 2019.
First examination report issued in corresponding in application No. 201914025819 dated Dec. 21, 2020.
Second office action with English Translation issued in corresponding CN application No. 201810710118.1 dated Oct. 16, 2020.
Chinese Decision to Refuse with English Translation for CN Application 201810710118.1 dated Mar. 9, 2021. (14 pages).
Communication pursuant to Article 94(3) EPC for EP Application 19183541.2 dated Mar. 9, 2021. (7 pages).

* cited by examiner

METHOD FOR CONTROLLING EARPHONE SWITCHING AND EARPHONE

CROSS-REFERENCE TO RELATED APPLICATION(S)

This application claims priority to Chinese Patent Application No. 201810710118.1, filed on Jul. 2, 2018, the disclosure of which is hereby incorporated by reference in its entirety.

TECHNICAL FIELD

This disclosure relates to the field of electronic technology, and more particularly to a method for controlling earphone switching and an earphone.

BACKGROUND

With the development of wireless technology, a scenario in which wireless earphones are coupled with electronic devices such as mobile phones through wireless technology is becoming increasingly prevalent. Functions such as listening to music, making a call, etc. can be realized with the wireless earphones. However, existing wireless earphones are unable to support master-slave switching, which provides poor experience for users.

SUMMARY

A first aspect of the disclosure provides a method for controlling earphone switching. The method includes the following. A first earphone acquires a first remaining power and a first operating parameter of the first earphone and a second remaining power and a second operating parameter of a second earphone. The first earphone is coupled with an electronic device and the second earphone and serves as a master earphone. The second earphone serves as a slave earphone. The first earphone predicts a first battery life of the first earphone according to the first remaining power and the first operating parameter and a second battery life of the second earphone according to the second remaining power and the second operating parameter. The first earphone predicts switches the second earphone to serve as the master earphone and the first earphone to serve as the slave earphone, when a difference between the second battery life and the first battery life is greater than a first preset threshold.

A second aspect of the disclosure provides an earphone. The terminal includes at least one processor and a computer readable storage. The computer readable storage is coupled to the at least one processor and stores at least one computer executable instruction thereon which, when executed by the at least one processor, causes the at least one processor to carry out the following actions. A first remaining power and a first operating parameter of the earphone and a second remaining power and a second operating parameter of other earphone are acquired. The earphone is configured to be coupled with an electronic device and the other earphone and serves as a master earphone, and the other earphone serves as a slave earphone. A first battery life of the earphone is predicted according to the first remaining power and the first operating parameter. A second battery life of the other earphone is predicted according to the second remaining power and the second operating parameter. The other earphone is switched to serve as the master earphone and the earphone is switched to serve as the slave earphone when a difference between the second battery life and the first battery life is greater than a first preset threshold.

A third aspect of the disclosure provides an earphone system. The earphone system includes a first earphone and a second earphone with only one of them being capable of coupling with an electronic device at a time. The first earphone is currently coupled with the electronic device and the second earphone. The first earphone includes at least one processor and a computer readable storage. The computer readable storage is coupled to the at least one processor and stores at least one computer executable instruction thereon which, when executed by the at least one processor, causes the at least one processor to carry out the following actions. A first remaining power and a first operating parameter of the first earphone and a second remaining power and a second operating parameter of the second earphone are acquired. A first battery life of the first earphone is predicted according to the first remaining power and the first operating parameter. A second battery life of the second earphone is predicted according to the second remaining power and the second operating parameter. A first data transmission link between the first earphone and the electronic device is disconnected and a second data transmission link between the second earphone and the electronic device is established, when a difference between the second battery life and the first battery life is greater than a first preset threshold.

BRIEF DESCRIPTION OF THE DRAWINGS

In order to describe technical solutions of implementations of the present disclosure or the related art more clearly, the following will give a brief description of accompanying drawings used for describing implementations of the present disclosure or the related art. Apparently, accompanying drawings described below are merely some implementations of the present disclosure. Those of ordinary skill in the art can also obtain other accompanying drawings based on the accompanying drawings described below without creative efforts.

DETAILED DESCRIPTION

Figure 1A:
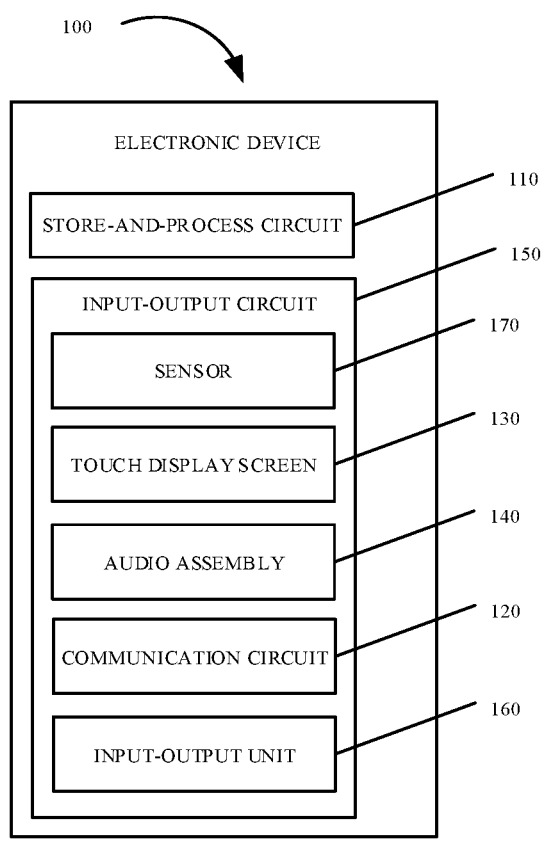
FIG. 1A is a schematic structural diagram illustrating an electronic device according to an implementation of the present disclosure.

In order for those skilled in the art to better understand technical solutions of the present disclosure, technical solutions of implementations of the present disclosure will be described clearly and completely with reference to accompanying drawings in implementations of the present disclosure. Apparently, implementations described hereinafter are merely some implementations, rather than all implementations, of the present disclosure. All other implementations obtained by those of ordinary skill in the art based on implementations of the present disclosure without creative efforts shall fall within the protection scope of the present disclosure.

Detailed description will be given below.

The terms "first", "second", "third", "fourth", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

An electronic device may include various handheld devices, in-vehicle devices, wearable devices, computing devices that have wireless communication functions or other processing devices connected to the wireless modem, as well as various forms of user equipments (UE), mobile stations (MS), terminal devices, and the like. For the convenience of description, the above-mentioned devices are collectively referred to as the electronic device.

In implementations of the present disclosure, a first earphone and a second earphone are both wireless earphones and can be taken as a pair of earphones after successful pairing. Communication between the wireless earphone and the electronic device can be conducted through the following technologies: wireless fidelity (Wi-Fi), Bluetooth, visible light communication, invisible light communication (such as infrared communication and ultraviolet communication), and the like. In the implementations, the first earphone can serve as a master earphone and the second earphone can serve as a slave earphone. A first data transmission link is established between the master earphone and the electronic device, through which data transmission between the wireless earphone and the electronic device is conducted. The slave earphone does not communicate initiatively with the electronic device. Pairing between the master earphone and the slave earphone can be achieved through Bluetooth, to further achieve communication between the master earphone and the slave earphone.

In an example, the wireless earphone can be ear hook earphones, earbuds, or over-ear/on-ear earphones, which is not limited herein.

The wireless earphone can be accommodated in an earphone case. The earphone case can include two receive cavities (i.e., a first receive cavity and a second receive cavity) and one or more earphone housing magnetic components which are disposed in the earphone case. The two receive cavities are designed for receiving a pair of wireless earphones (i.e., a left earbud and a right earbud) both in size and shape. The one or more earphone housing magnetic components are configured to attract and fix magnetically the pair of wireless earphones in the two receive cavities respectively. The earphone case can further include a cover. In terms of size and shape, the first receive cavity is designed for receiving the first earphone, and the second receive cavity is designed for receiving the second earphone.

The wireless earphone can include an earphone housing, a rechargeable battery (such as a lithium battery) accommodated in the earphone housing, multiple metal contacts for coupling the rechargeable battery with a charging device, and a speaker assembly including a driver unit and a directional voice port. The driver unit includes a magnetic body, a voice coil, and an isolation membrane. The driver unit is configured to make a sound from the directional voice port. The multiple metal contacts are arranged on an outer surface of the earphone housing.

In an example, the wireless earphone further includes a touch area. The touch area is located on the outer surface of the earphone housing. The touch area is provided with at least one touch sensor to detect touch operations. The touch sensor can include a capacitive sensor. When the touch area is touched by a user, at least one capacitive sensor will detect its own change in capacitance, thereby recognizing touch operations.

In an example, the wireless earphone further includes an acceleration sensor and a three-axis gyroscope. The acceleration sensor and the three-axis gyroscope are accommodated in the earphone housing to recognize a pick-up operation and a take-out operation of the wireless earphone.

In an example, the wireless earphone further includes at least one barometric pressure sensor. The barometric pressure sensor can be disposed on the outer surface of the earphone housing and is configured to detect barometric pressure in an ear after the wireless earphone is put on. Thus, tightness of an earphone in a wearing state can be detected with the barometric pressure sensor. When the wireless earphone is detected to be loosely worn, the wireless earphone can send prompt information to an electronic device coupled with the wireless earphone, to remind a user that the wireless earphone has a risk of falling off.

Hereinafter, implementations of the present disclosure will be described in detail.

FIG. 1A is a schematic structural diagram illustrating an electronic device according to an implementation of the present disclosure. As illustrated in FIG. 1A, the electronic device 100 includes a store-and-process circuit 110 and a sensor 170 coupled with the store-and-process circuit 110.

The electronic device 100 can include a control circuit. The control circuit can include the store-and-process circuit 110. The store-and-process circuit 110 may be a memory, such as a hard drive memory, a non-transitory memory (such as a flash memory, other electronically programmable read-only memories used to form a solid-state drive, or the like), a transitory memory (such as a static random access memory, dynamic random access memory, or the like), or the like, which is not limited herein. The store-and-process circuit 110 has a processing circuit to control operations of the electronic device 100. The processing circuit can be implemented based on one or more microprocessors, microcontrollers, digital signal processors, baseband processors, power management units, audio codec chips, application-specific integrated circuits, display driver integrated circuits, or the like.

The store-and-process circuit 110 can be configured to run software of the electronic device 100, such as an Internet browsing application, a voice over Internet protocol (VOIP) phone call application, an email application, a media playback application, an operating system function, and the like. The software may be used to perform some control operations, such as camera-based image collection, ambient light sensor-based ambient light measurements, proximity sensor-based proximity state measurements, information display function based on status indicators such as status indicator lamps of light-emitting diodes (LEDs), touch sensor-based touch event detection, functions associated with displaying information on multiple (e.g., layered) displays, operations associated with implementing wireless communication functions, operations associated with collecting and generating audio signals, control operations associated with collecting and processing button-press event data, and other functions of the electronic device 100, which is not limited herein.

The electronic device 100 can further include an input-output circuit 150. The input-output circuit 150 can be configured to achieve data input and data output of the electronic device 100, that is, to allow the electronic device 100 to receive data from an external device and also allow the electronic device 100 to output data to an external device. The input-output circuit 150 can further include a sensor 170. The sensor 170 can include an ambient light sensor, an optical or capacitive proximity sensor, a touch sensor (e.g., based on an optical touch sensor and/or a capacitive touch sensor, where the touch sensor may be a part of a touch display screen or may be used independently as a touch sensor structure), an acceleration sensor, a gravity sensor, and other sensors.

The input-output circuit 150 can further include one or more display devices, such as a display 130. The display 130 may include one or more of a liquid crystal display, an organic light emitting diode (OLED) display, an electronic ink display, a plasma display, and displays based on other display technologies. As an example, the display 130 includes an array of touch sensors (i.e., the display device 130 can be a touch display screen). The touch sensor may be a capacitive touch sensor formed by an array of transparent touch sensor electrodes (e.g., indium tin oxide (ITO) electrodes), or may be a touch sensor formed with other touch technologies, such as acoustic touch, pressure sensitive touch, resistance touch, optical touch, and the like, which is not limited herein.

An audio assembly 140 is configured to provide the electronic device 100 with audio input and output functions. The audio assembly 140 of the electronic device 100 may include speakers, microphones, buzzers, tone generators, and other assemblies for generating and detecting sound.

A communication circuit 120 is configured to provide the electronic device 100 with the ability to communicate with external devices. As an example, the communication circuit 120 includes analog/digital input-output interface circuits and wireless communication circuits based on radio frequency signals and/or optical signals. The wireless communication circuit of the communication circuit 120 may include a radio frequency transceiver circuit, a power amplifier circuit, a low-noise amplifier, a switch, a filter, and an antenna. As an example, the wireless communication circuit of the communication circuit 120 includes a circuit for supporting near field communication (NFC) by transmitting and receiving near field coupled electromagnetic signals. Specifically, the communication circuit 120 includes an NFC antenna and an NFC transceiver. As another example, the communication circuit 120 further includes transceivers and antennas for a cellular telephone, transceiver circuits and antennas for a wireless local area network, and the like.

The electronic device 100 can further include a battery, a power management circuit, and other input-output units 160. The other input-output units 160 include but are not limited to buttons, joysticks, click wheels, scroll wheels, touch pads, keypads, keyboards, cameras, LEDs, and other status indicators.

An instruction can be input by a user via the input-output circuit 150 to control operations of the electronic device 100, and state information and other outputs can be received from the electronic device 100 with the input-output circuit 150 outputting data.

In addition, in implementations of the present disclosure, for the structure of the first earphone or the second earphone, reference can be made to the electronic device illustrated in FIG. 1A.

Figure 1B:
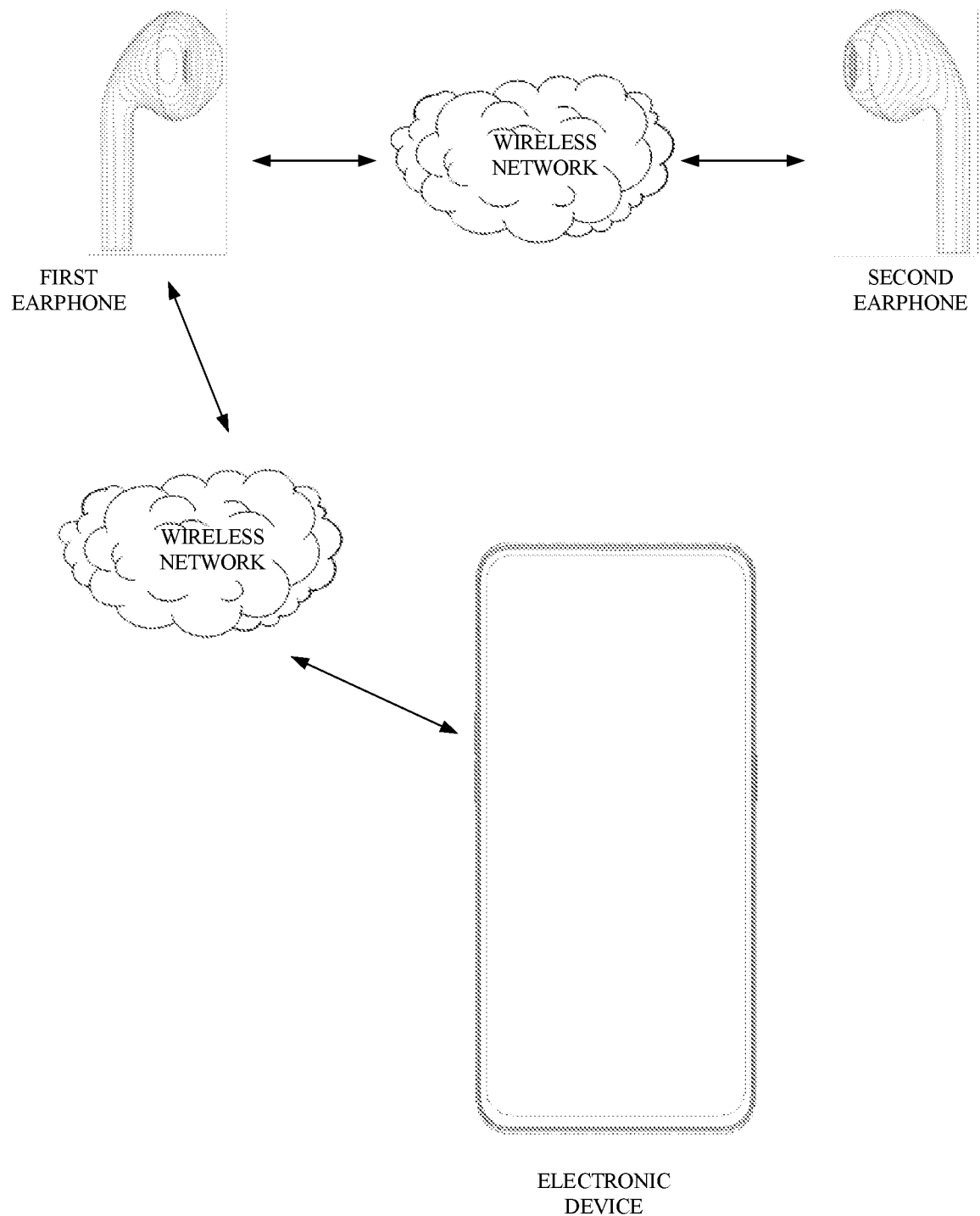
FIG. 1B is a schematic diagram illustrating a system network architecture for performing a method for controlling earphone switching according to an implementation of the present disclosure.

FIG. 1B is a schematic diagram illustrating a system network architecture for performing a method for controlling earphone switching according to an implementation of the present disclosure. As illustrated in FIG. 1B, the first earphone serves as the master earphone. The second earphone serves as the slave earphone. The first earphone and the second earphone communicate with each other via a wireless network, and the wireless network can be Bluetooth, infrared, etc. A first data transmission link is established between the first earphone and the electronic device via a wireless network, and the wireless network can be Wi-Fi, Bluetooth, visible light communication, invisible light communication (infrared communication and ultraviolet communication), or the like. Based on the first data transmission link, data transmission (such as speech data, image data, video data, etc.) can be conducted between the first earphone and the electronic device. The master earphone refers to an earphone that currently in communication with the electronic device via a data transmission link established with the electronic device for example, and the slave earphone refers to an earphone that does not currently in communication with the electronic device. At a time point, only one earphone can communicate with the electronic device via the data transmission link established there between.

The electronic device illustrated in FIG. 1A is applicable to a system illustrated in FIG. 1B. As illustrated in FIG. 1B, the system includes an earphone system. The earphone system includes a first earphone and a second earphone with only one of them being capable of coupling with an electronic device at a time. The term "first" and "second" are used herein to distinguish one earphone from another, however, the earphones are the same in terms of structure even though they play different roles in the earphone system. The first earphone is currently coupled with the electronic device and the second earphone. Therefore ,the first earphone can be treated as the master phone and accordingly, the second earphone can be treated as the slave earphone. The first earphone includes at least one processor and a computer readable storage. The computer readable storage is coupled to the at least one processor and stores at least one computer executable instruction thereon which, when executed by the at least one processor, causes the at least one processor to carry out the following actions. A first remaining power and a first operating parameter of the first earphone and a second remaining power and a second operating parameter of the second earphone are acquired. A first battery life of the first earphone is predicted according to the first remaining power and the first operating parameter. A second battery life of the second earphone is predicted according to the second remaining power and the second operating parameter. A first data transmission link between the first earphone and the electronic device is disconnected and a second data transmission link between the second earphone and the electronic device is established, when a difference between the second battery life and the first battery life is greater than a first preset threshold. As such, the first earphone can be switched into the slave earphone and the second earphone can be switched into the master earphone.

Figure 1C:
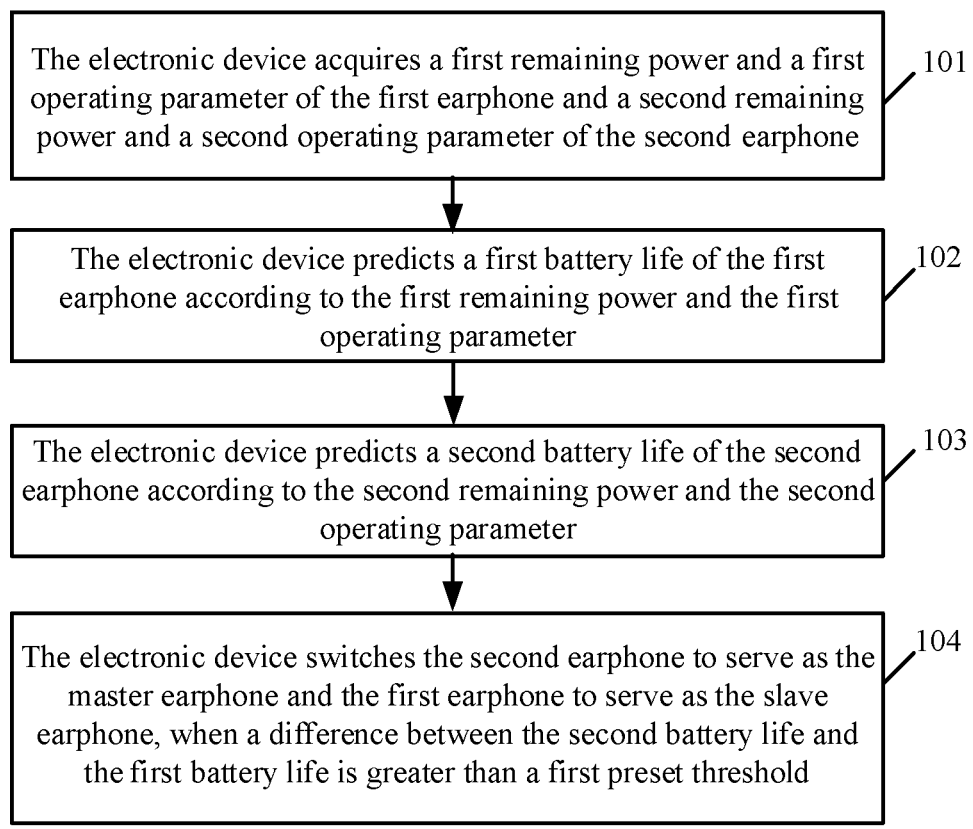
FIG. 1C is a schematic flowchart illustrating a method for controlling earphone switching according to an implementation of the present disclosure.

FIG. 1C is a schematic flowchart illustrating a method for controlling earphone switching according to an implementation of the present disclosure. The method is applicable to the electronic device illustrated in FIG. 1A and the system illustrated in FIG. 1B. As illustrated in FIG. 1C, the method includes the following.

At 101, the electronic device acquires a first remaining power and a first operating parameter of the first earphone and a second remaining power and a second operating parameter of the second earphone.

In this implementation, the first earphone serves as the master earphone. The second earphone serves as the slave earphone. The first operating parameter and the second operating parameter described above can both include at least one of: working current, working voltage, working power, volume, and the like, which is not limited herein. Since a first data transmission link between the first earphone and the electronic device has been established, the electronic device can acquire the first remaining power and the first operating parameter of the first earphone via the first data transmission link. Since the first earphone has also been coupled with the second earphone, the second remaining power and the second operating parameter of the second earphone can both be acquired by the first earphone and then be transmitted by the first earphone to the electronic device via the first data transmission link. As such, the electronic device can acquire the second remaining power and the second operating parameter of the second earphone.

At 102, a first battery life of the first earphone is predicted according to the first remaining power and the first operating parameter.

The first operating parameter determines to some extent a power consumption rate of the first earphone, and hence determines a battery life of the first earphone.

In an implementation, the electronic device pre-stores a mapping relationship set. The mapping relationship set includes multiple first mapping relationships. Each first mapping relationship is a mapping relationship between operating parameters and power consumption rates. The first battery life of the first earphone is predicted according to the first remaining power and the first operating parameter at 102 as follows.

At 21, a current application is determined.

At 22, a target first mapping relationship corresponding to the current application is determined according to a preset correspondence relationship between applications and the multiple first mapping relationships.

At 23, a first target power consumption rate corresponding to the first operating parameter is determined according to the target first mapping relationship.

At 24, the first battery life is determined according to the first remaining power and the first target power consumption rate.

"Applications" referred to herein may include at least one of: game applications, music playback applications, video playback applications, instant messaging (IM) applications, social applications, payment applications, or the like, which is not limited herein. For an earphone, different applications lead to different power consumption rates of the earphone. For example, in terms of making a phone call and listening to music with the earphone, power consumption rates are different. Here, the electronic device pre-stores the mapping relationship set. The mapping relationship set includes the multiple first mapping relationships between operating parameters and power consumption rates. For example, a higher volume corresponds to a higher power consumption rate. The electronic device further pre-stores the preset correspondence relationship between the applications and the multiple first mapping relationships, where different applications correspond to different first mapping relationships. Therefore, after the current application is determined, the target first mapping relationship corresponding to the current application can be determined. Accordingly, the first target power consumption rate corresponding to the first operating parameter can be determined according to the target first mapping relationship. Based on the above, the first battery life can be obtained by dividing the first remaining power by the first target power consumption rate (that is, the first battery life=the first remaining power/the first target power consumption rate).

At 103, a second battery life of the second earphone is predicted according to the second remaining power and the second operating parameter.

The second operating parameter determines to some extent a power consumption rate of the second earphone and further determines a battery life of the second earphone. The second earphone serves as the slave earphone that has a function different from that of the master earphone. Therefore, the manner in which a battery life of the slave earphone (that is, the second earphone) is determined is different from the manner in which a battery life of the master earphone (that is, the first earphone) is determined.

In an implementation, the second battery life of the second earphone is predicted according to the second remaining power and the second operating parameter at 103 as follows.

At 31, a second target power consumption rate corresponding to the second operating parameter is determined according to a preset second mapping relationship between operating parameters and power consumption rates.

At 32, the second battery life is determined according to the second remaining power and the second target power consumption rate.

The electronic device can pre-store a second mapping relationship between operating parameters and power consumption rates, and accordingly determine the second target power consumption rate according to the second mapping relationship. Based on the above, the second battery life can be obtained by dividing the second remaining power by the second target power consumption rate (that is, the second battery life=the second remaining power/the second target power consumption rate).

At 104, when a difference between the second battery life and the first battery life is greater than a first preset threshold, the second earphone is switched to serve as the master earphone and the first earphone is switched to serve as the slave earphone.

The first preset threshold above can be set by a user or by default. When the difference between the second battery life and the first battery life is greater than the first preset threshold, the second earphone is switched to serve as the master earphone and the first earphone is switched to serve as the slave earphone. In this way, the power consumption rate of the first earphone can be reduced, thereby balancing a power of the first earphone and a power of the second earphone.

In an implementation, the second earphone is switched to serve as the master earphone and the first earphone is switched to serve as the slave earphone at 104 as follows. A first data transmission link with the first earphone is disconnected, and a second data transmission link with the second earphone is established.

In this implementation, the electronic device disconnects the first data transmission link between the first earphone and the electronic device and establishes the second data transmission link between the electronic device and the second earphone, thereby achieving switching between master and slave earphones.

In one implementation, the first data transmission link with the first earphone is disconnected and the second data transmission link with the second earphone is established as follows. A first request and a second request are sent to the first earphone. The first request is used for requesting the first earphone to disconnect the first data transmission link with the electronic device. The second request is used for requesting the first earphone to forward the second request to the second earphone and instructing the second earphone to establish the second data transmission link with the electronic device.

In this implementation, the electronic device sends the first request and the second request to the first earphone. The first request is used for requesting the first earphone to disconnect the first data transmission link with the electronic device. The second request is forwarded by the first earphone to the second earphone to instruct the second earphone to establish the second data transmission link with the electronic device. As such, communication between the second earphone and the electronic device can be achieved via the first earphone, whereby the second earphone communicates initiatively with the electronic device to establish the second data transmission link with the electronic device, thereby achieving switching between master and slave earphones.

In another implementation, the first data transmission link with the first earphone is disconnected and the second data transmission link with the second earphone is established as follows. A third request is sent to the first earphone. The third request is used for requesting the first earphone to disconnect the first data transmission link with the electronic device. A fourth request is sent to the second earphone. The fourth request is used for requesting the second earphone to establish the second data transmission link with the electronic device.

In this implementation, the electronic device sends the third request to the first earphone to request the first earphone to disconnect the first data transmission link with the electronic device. The electronic device sends the fourth request to the second earphone. Specifically, the electronic device first searches for the second earphone and then sends the fourth request to the second earphone (for example, broadcasts the fourth request designated to the second earphone). The fourth request is used for requesting the second earphone to establish the second data transmission link with the electronic device.

In an implementation, after the second earphone is switched to serve as the master earphone and the first earphone is switched to serve as the slave earphone, the following can be conducted. When the difference between the second battery life and the first battery life is greater than a second preset threshold, the first operating parameter of the first earphone is adjusted. The first preset threshold is smaller than the second preset threshold.

The second preset threshold can be set by a user or by default. The first preset threshold is smaller than the second preset threshold. When the difference between the second battery life and the first battery life is greater than the second preset threshold, the first operating parameter of the first earphone can be adjusted, to reduce power consumption of the first earphone and thus achieve balance between the first earphone and the second earphone in power. In normal cases, if only one of a pair of earphones has power, the user will usually feel uncomfortable when using only one earphone. Therefore, after the first earphone is switched to serve as the slave earphone, the first operating parameter of the first earphone is adjusted to further reduce power consumption of the first earphone, so as to prolong the battery life of the first earphone. The first operating parameter of the first earphone can be adjusted in at least one of the following manners: turning down a volume, reducing power, entering a standby mode, entering a sleep mode, and the like, which is not limited herein.

The method for controlling earphone switching described in the above implementations of the disclosure is applicable to the electronic device. According to the method, the first remaining power and the first operating parameter of the first earphone and the second remaining power and the second operating parameter of the second earphone are acquired. The first earphone serves as the master earphone. The second earphone serves as the slave earphone. The first battery life of the first earphone is predicted according to the first remaining power and the first operating parameter. The second battery life of the second earphone is predicted according to the second remaining power and the second operating parameter. When the difference between the second battery life and the first battery life is greater than the first preset threshold, the second earphone is switched to serve as the master earphone and the first earphone is switched to serve as the slave earphone. As such, when a battery life of the master earphone is shorter than that of the slave earphone, switching between master and slave earphones can be achieved, which improves user experience.

Figure 2:
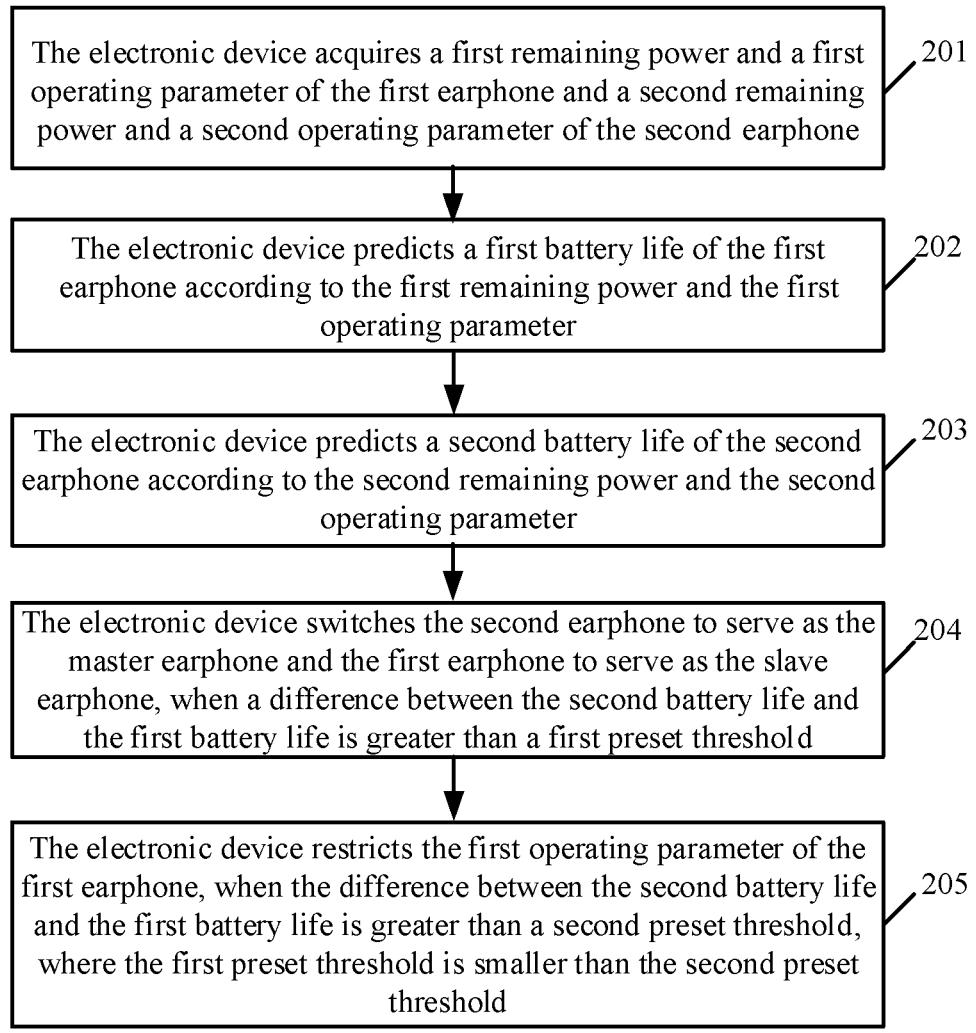
FIG. 2 is a schematic flowchart illustrating a method for controlling earphone switching according to another implementation of the present disclosure.

Similar to the above implementations, FIG. 2 is a schematic flowchart illustrating a method for controlling earphone switching according to another implementation of the present disclosure. The method is applicable to the electronic device illustrated in FIG. 1A and the system illustrated in FIG. 1B. As illustrated in FIG. 2, the method includes the following.

At 201, the electronic device acquires a first remaining power and a first operating parameter of a first earphone and a second remaining power and a second operating parameter of a second earphone.

At 202, a first battery life of the first earphone is predicted according to the first remaining power and the first operating parameter.

At 203, a second battery life of the second earphone is predicted according to the second remaining power and the second operating parameter.

At 204, when a difference between the second battery life and the first battery life is greater than a first preset threshold, the second earphone is switched to serve as a master earphone and the first earphone is switched to serve as a slave earphone.

At 205, if the difference between the second battery life and the first battery life is greater than a second preset threshold, the first operating parameter of the first earphone is adjusted. The first preset threshold is smaller than the second preset threshold.

According to the method for controlling earphone switching of the above implementation, the first remaining power and the first operating parameter of the first earphone and the second remaining power and the second operating parameter of the second earphone are acquired. The first earphone serves as the master earphone. The second earphone serves as the slave earphone. The first battery life of the first earphone is predicted according to the first remaining power and the first operating parameter. The second battery life of the second earphone is predicted according to the second remaining power and the second operating parameter. When the difference between the second battery life and the first battery life is greater than the first preset threshold, the second earphone is switched to serve as the master earphone and the first earphone is switched to serve as the slave earphone. If the difference between the second battery life and the first battery life is greater than the second preset threshold, the first operating parameter of the first earphone is adjusted. The first preset threshold is smaller than the second preset threshold. As such, when a battery life of the master earphone is shorter than that of the slave earphone, switching between master and slave earphones can be achieved. In addition, when a difference between a battery life of the first earphone and a battery life of the second earphone reaches a certain threshold, the first operating parameter of the first earphone can be adjusted, to achieve balance between the first earphone and the second earphone in power, which is possible to improve user experience.

Figure 3:
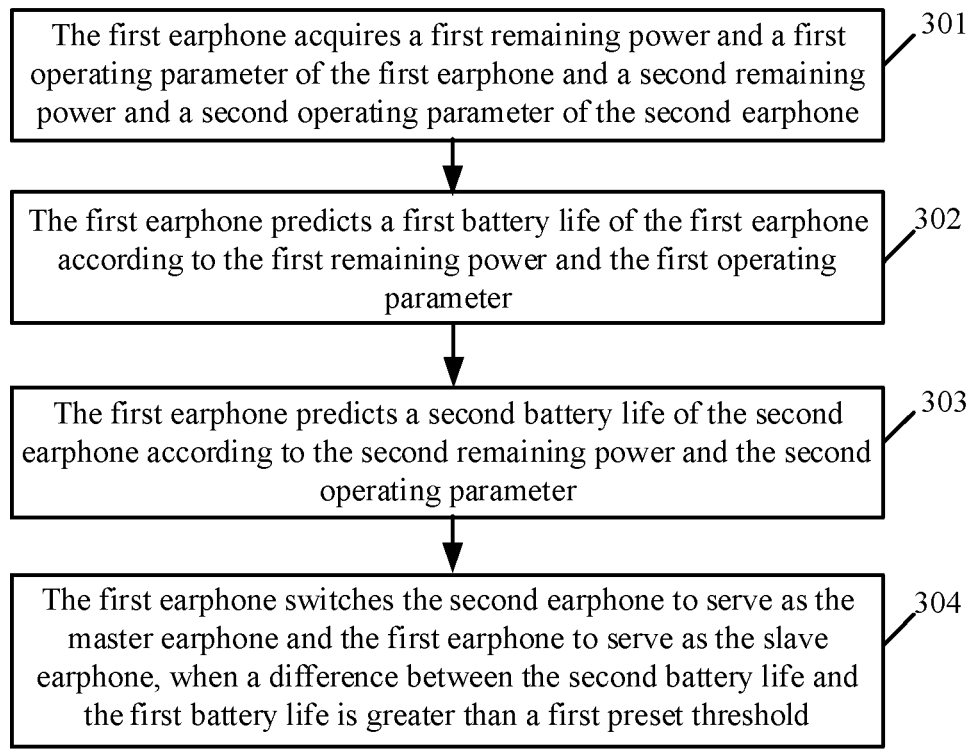
FIG. 3 is a schematic flowchart illustrating a method for controlling earphone switching according to another implementation of the present disclosure.

Similar to the above implementations, FIG. 3 is a schematic flowchart illustrating a method for controlling earphone switching according to another implementation of the present disclosure. The method is applicable to a master earphone and the system illustrated in FIG. 1B. As illustrated in FIG. 3, the method includes the following.

At 301, a first earphone acquires a first remaining power and a first operating parameter of the first earphone and a second remaining power and a second operating parameter of a second earphone.

In this implementation, the first earphone serves as the master earphone. The second earphone serves as a slave earphone. The first operating parameter and the second operating parameter described above can both include at least one of: working current, working voltage, working power, volume, and the like, which is not limited herein. The first earphone can read the first remaining power and the first operating parameter of the first earphone itself and acquire the second remaining power and the second operating parameter of the second earphone via a network between the first earphone and the second earphone.

At 302, a first battery life of the first earphone is predicted according to the first remaining power and the first operating parameter.

The first operating parameter determines to some extent a power consumption rate of the first earphone, and hence determines a battery life of the first earphone.

In an example, the first earphone pre-stores a mapping relationship set. The mapping relationship set includes multiple first mapping relationships between operating parameters and power consumption rates. The first battery life of the first earphone is predicted according to the first remaining power and the first operating parameter at 302 as follows.

At 21, a current application is determined.

At 22, a target first mapping relationship corresponding to the current application is determined according to a preset correspondence relationship between applications and the multiple first mapping relationships.

At 23, a first target power consumption rate corresponding to the first operating parameter is determined according to the target first mapping relationship.

At 24, the first battery life is determined according to the first remaining power and the first target power consumption rate.

"Applications" referred to herein may include at least one of: game applications, music playback applications, video playback applications, IM applications, social applications, payment applications, or the like, which is not limited herein. For an earphone, different applications lead to different power consumption rates of the earphone. For example, in terms of making a phone call and listening to music with the earphone, power consumption rates are different. Here, the first earphone pre-stores the mapping relationship set. The mapping relationship set includes the multiple first mapping relationship between operating parameters and power consumption rates. For example, a higher volume corresponds to a higher power consumption rate. The first earphone further pre-stores the preset correspondence relationship between the applications and the multiple first mapping relationships, where different applications correspond to different first mapping relationships. Therefore, after the current application is determined, the target first mapping relationship corresponding to the current application can be determined. Accordingly, the first target power consumption rate corresponding to the first operating parameter can be determined according to the target first mapping relationship. Based on the above, the first battery life can be obtained by dividing the first remaining power by the first target power consumption rate (that is, the first battery life=the first remaining power/the first target power consumption rate).

At 303, a second battery life of the second earphone is predicted according to the second remaining power and the second operating parameter.

The second operating parameter determines to some extent a power consumption rate of the second earphone and further determines a battery life of the second earphone. The second earphone serves as the slave earphone that has a function different from that of the master earphone. Therefore, the manner in which a battery life of the slave earphone (that is, the second earphone) is determined is different from the manner in which a battery life of the master earphone (that is, the first earphone) is determined.

In an example, the second battery life of the second earphone is predicted according to the second remaining power and the second operating parameter at 303 as follows.

At 31, a second target power consumption rate corresponding to the second operating parameter is determined according to a preset second mapping relationship between operating parameters and power consumption rates.

At 32, the second battery life is determined according to the second remaining power and the second target power consumption rate.

The first earphone can pre-store a second mapping relationship between operating parameters and power consumption rates, and accordingly determine the second target power consumption rate according to the second mapping relationship. Based on the above, the second battery life can be obtained by dividing the second remaining power by the second target power consumption rate (that is, the second battery life=the second remaining power/the second target power consumption rate).

At 304, when a difference between the second battery life and the first battery life is greater than a first preset threshold, the second earphone is switched to serve as the master earphone and the first earphone is switched to serve as the slave earphone.

The first preset threshold above can be set by a user or by default. When the difference between the second battery life and the first battery life is greater than the first preset threshold, the second earphone is switched to serve as the master earphone and the first earphone is switched to serve as the slave earphone. In this way, the power consumption rate of the first earphone can be reduced, thereby balancing a power of the first earphone and a power of the second earphone.

In one implementation, the second earphone is switched to serve as the master earphone and the first earphone is switched to serve as the slave earphone at 304 as follows. A first data transmission link with the electronic device is disconnected, and a fifth request is sent to the second earphone. The fifth request is used for requesting the second earphone to establish a second data transmission link with the electronic device.

In this implementation, the first earphone can disconnect initiatively the first data transmission link with the electronic device and send the fifth request to the second earphone to request the second earphone to establish a second data transmission link with the electronic device.

In another implementation, the second earphone is switched to serve as the master earphone and the first earphone is switched to serve as the slave earphone at 304 as follows. A sixth request is sent to the electronic device, and a first data transmission link with the electronic device is disconnected. The sixth request is used for requesting the electronic device to establish a second data transmission link with the second earphone.

In this implementation, the first earphone can first send the sixth request to the electronic device and disconnect initiatively the first data transmission link with the electronic device after sending the sixth request. The sixth request is used for requesting the electronic device to establish a second data transmission link with the second earphone.

In yet another implementation, the second earphone is switched to serve as the master earphone and the first earphone is switched to serve as the slave earphone at 304 as follows. A seventh request is sent to the electronic device to request the electronic device to disconnect a first data transmission link with the first earphone and establish a second data transmission link with the second earphone.

In this implementation, the first earphone can send the seventh request to the electronic device, where the seventh request is used for requesting the electronic device to disconnect the first data transmission link with the first earphone and establish the second data transmission link with the second earphone.

In an implementation, after the second earphone is switched to serve as the master earphone and the first earphone is switched to serve as the slave earphone, the following can be conducted. When the difference between the second battery life and the first battery life is greater than a second preset threshold, the first operating parameter of the first earphone is adjusted. The second preset threshold is greater than the first preset threshold.

The second preset threshold can be set by a user or by default. When the difference between the second battery life and the first battery life is greater than the second preset threshold, the first operating parameter of the first earphone can be adjusted, to reduce power consumption of the first earphone and thus achieve balance between the first earphone and the second earphone in power. Therefore, after the first earphone is switched to serve as the slave earphone, the first operating parameter of the first earphone is adjusted to further reduce power consumption of the first earphone, so as to prolong the battery life of the first earphone.

The method for controlling earphone switching described in the above implementations is applicable to the first earphone. According to the method, the first remaining power and the first operating parameter of the first earphone and the second remaining power and the second operating parameter of the second earphone are acquired. The first earphone serves as the master earphone. The second earphone serves as the slave earphone. The first battery life of the first earphone is predicted according to the first remaining power and the first operating parameter. The second battery life of the second earphone is predicted according to the second remaining power and the second operating parameter. When the difference between the second battery life and the first battery life is greater than the first preset threshold, the second earphone is switched to serve as the master earphone and the first earphone is switched to serve as the slave earphone. In this way, when a battery life of the master earphone is shorter than that of the slave earphone, switching between master and slave earphones can be achieved, and thus user experience can be improved.

Figure 4:
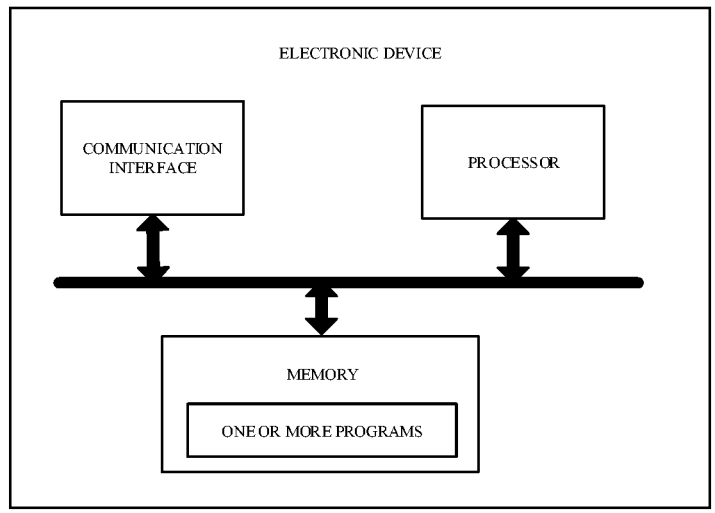
FIG. 4 is a schematic structural diagram illustrating an electronic device according to another implementation of the present disclosure.

FIG. 4 is a schematic structural diagram illustrating an electronic device according to another implementation of the present disclosure. As illustrated in FIG. 4, the electronic device includes a processor, a memory, a communication interface, and one or more programs stored in the memory and configured to be executed by the processor. The electronic device can be the electronic device illustrated in FIG. 1A and be applicable to the system illustrated in FIG. 1B. The one or more programs include instructions operable with the processor to: acquire a first remaining power and a first operating parameter of a first earphone and a second remaining power and a second operating parameter of a second earphone, where the first earphone serves as a master earphone and the second earphone serves as a slave earphone; predict a first battery life of the first earphone according to the first remaining power and the first operating parameter; predict a second battery life of the second earphone according to the second remaining power and the second operating parameter; and switch the second earphone to serve as a master earphone and the first earphone to serve as a slave earphone when a difference between the second battery life and the first battery life is greater than a first preset threshold.

With aid of the electronic device described in the above implementation, the first remaining power and the first operating parameter of the first earphone and the second remaining power and the second operating parameter of the second earphone are acquired. The first earphone serves as the master earphone. The second earphone serves as the slave earphone. The first battery life of the first earphone is predicted according to the first remaining power and the first operating parameter. The second battery life of the second earphone is predicted according to the second remaining power and the second operating parameter. When the difference between the second battery life and the first battery life is greater than the first preset threshold, the second earphone is switched to serve as the master earphone and the first earphone is switched to serve as the slave earphone. In this way, when a battery life of the master earphone is shorter than that of the slave earphone, switching between master and slave earphones can be achieved, thereby improving user experience.

In an example, the electronic device pre-stores a mapping relationship set. The mapping relationship set includes multiple first mapping relationships between operating parameters and power consumption rates. In terms of predicting the first battery life of the first earphone according to the first remaining power and the first operating parameter, the one or more programs include instructions operable with the processor to: determine a current application, determine a target first mapping relationship corresponding to the current application according to a preset correspondence relationship between applications and the multiple first mapping relationships, determine a first target power consumption rate corresponding to the first operating parameter according to the target first mapping relationship, and determine the first battery life according to the first remaining power and the first target power consumption rate.

In an example, in terms of predicting the second battery life of the second earphone according to the second remaining power and the second operating parameter, the one or more programs include instructions operable with the processor to: determine a second target power consumption rate corresponding to the second operating parameter according to a preset second mapping relationship between operating parameters and power consumption rates, and determine the second battery life according to the second remaining power and the second target power consumption rate.

In an example, in terms of switching the second earphone to serve as the master earphone and the first earphone to serve as the slave earphone, the one or more programs include instructions operable with the processor to: disconnect a first data transmission link with the first earphone, and establish a second data transmission link with the second earphone.

In an example, in terms of disconnecting the first data transmission link with the first earphone and establishing the second data transmission link with the second earphone, the one or more programs include instructions operable with the processor to: send a first request and a second request to the first earphone, where the first request is used for requesting the first earphone to disconnect the first data transmission link with the electronic device and the second request is used for requesting the first earphone to forward the second request to the second earphone and instructing the second earphone to establish the second data transmission link with the electronic device.

In an example, in terms of disconnecting the first data transmission link with the first earphone, and establishing the second data transmission link with the second earphone, the one or more programs include instructions operable with the processor to: send a third request to the first earphone, where the third request is used for requesting the first earphone to disconnect the first data transmission link with the electronic device; and send a fourth request to the second earphone, where the fourth request is used for requesting the second earphone to establish the second data transmission link with the electronic device.

In an example, after switching the second earphone to serve as the master earphone and the first earphone to serve as the slave earphone, the one or more programs further include instructions operable with the processor to: adjust the first operating parameter of the first earphone when the difference between the second battery life and the first battery life is greater than a second preset threshold, where the first preset threshold is smaller than the second preset threshold.

The foregoing technical solutions of implementations of the disclosure are mainly described from a perspective of execution of the method. It can be understood that, in order to implement the above functions, the electronic device includes hardware structures and/or software modules for performing respective functions. Those of ordinary skill in the art will appreciate that units and algorithmic operations of various examples described in connection with implementations herein can be implemented in hardware or a combination of computer software and hardware. Whether these functions are implemented by means of hardware or software depends on the particular application and the design constraints of the associated technical solution. For a specific application, those skilled in the art may use different methods to implement the described functionality, but such implementation should not be regarded as beyond the scope of the disclosure.

In implementations of the present disclosure, the electronic device can be divided into different functional units according to the above method implementations. For example, the electronic device can be divided into different functional units corresponding to each function, or two or more functions may be integrated into one processing unit. The integrated unit can take the form of hardware or a software functional unit. It is to be noted that, division of units provided herein is illustrative and is just a logical function division. In practice, there can be other manners of division.

Figure 5:
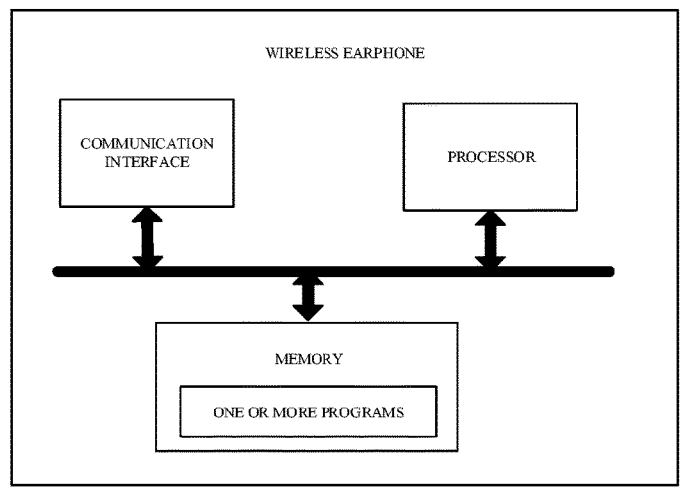
FIG. 5 is a schematic structural diagram illustrating a wireless earphone according to an implementation of the present disclosure.

FIG. 5 is a schematic structural diagram illustrating a wireless earphone according to an implementation of the present disclosure. As illustrated in FIG. 5, the wireless earphone includes a processor, a memory, a communication interface, and one or more programs stored in the memory and configured to be executed by the processor. The wireless earphone illustrated in FIG. 5 serves as a master earphone and is applicable to the system illustrated in FIG. 1B. The one or more programs include instructions operable with the processor to: acquire a first remaining power and a first operating parameter of a first earphone and a second remaining power and a second operating parameter of a second earphone; predict a first battery life of the first earphone according to the first remaining power and the first operating parameter; predict a second battery life of the second earphone according to the second remaining power and the second operating parameter; and switch the second earphone to serve as the master earphone and the first earphone to serve as a slave earphone when a difference between the second battery life and the first battery life is greater than a first preset threshold.

With aid of the first earphone described in the above implementation, the first remaining power and the first operating parameter of the first earphone and the second remaining power and the second operating parameter of the second earphone are acquired. The first earphone serves as the master earphone. The second earphone serves as the slave earphone. The first battery life of the first earphone is predicted according to the first remaining power and the first operating parameter. The second battery life of the second earphone is predicted according to the second remaining power and the second operating parameter. When the difference between the second battery life and the first battery life is greater than the first preset threshold, the second earphone is switched to serve as the master earphone and the first earphone is switched to serve as the slave earphone. In this way, when a battery life of the master earphone is shorter than that of the slave earphone, switching between master and slave earphones can be achieved, thereby improving user experience.

In an example, in terms of switching the second earphone to serve as the master earphone and the first earphone to serve as the slave earphone, the one or more programs include instructions operable with the processor to: disconnect a first data transmission link with the electronic device, and send a fifth request to the second earphone, where the fifth request is used for requesting the second earphone to establish a second data transmission link with the electronic device.

In an example, in terms of switching the second earphone to serve as the master earphone and the first earphone to serve as the slave earphone, the one or more programs include instructions operable with the processor to: send a sixth request to the electronic device, and disconnect a first data transmission link with the electronic device, where the sixth request is used for requesting the electronic device to establish a second data transmission link with the second earphone.

Figure 6A:
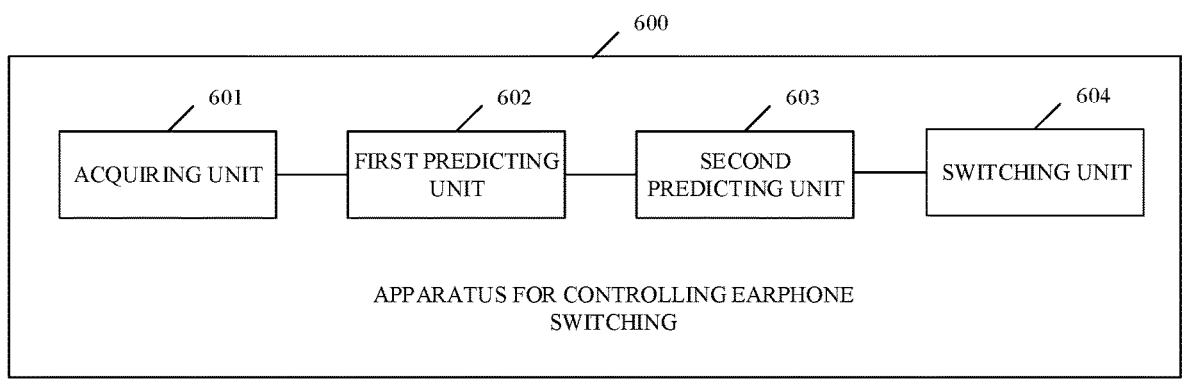
FIG. 6A is a schematic structural diagram illustrating an apparatus for controlling earphone switching according to an implementation of the present disclosure.

FIG. 6A is a schematic structural diagram illustrating an apparatus 600 for controlling switching between master and slave earphones according to an implementation of the present disclosure. The apparatus is applicable to an electronic device and the system illustrated in FIG. 1B. For the structure of the electronic device, reference can be made to FIG. 1A. The apparatus includes an acquiring unit 601, a first predicting unit 602, a second predicting unit 603, and a switching unit 604.

The acquiring unit 601 is configured to acquire a first remaining power and a first operating parameter of a first earphone and a second remaining power and a second operating parameter of a second earphone. The first earphone serves as a master earphone and the second earphone serves as a slave earphone.

The first predicting unit 602 is configured to predict a first battery life of the first earphone according to the first remaining power and the first operating parameter.

The second predicting unit 603 is configured to predict a second battery life of the second earphone according to the second remaining power and the second operating parameter.

The switching unit 604 is configured to switch the second earphone to serve as the master earphone and the first earphone to serve as the slave earphone, when a difference between the second battery life and the first battery life is greater than a first preset threshold.

The apparatus for controlling earphone switching is applicable to the electronic device. The acquiring unit 601 acquires the first remaining power and the first operating parameter of the first earphone and the second remaining power and the second operating parameter of the second earphone, where the first earphone serves as the master earphone and the second earphone serves as the slave earphone. The first predicting unit 602 predicts the first battery life of the first earphone according to the first remaining power and the first operating parameter. The second predicting unit 603 predicts the second battery life of the second earphone according to the second remaining power and the second operating parameter. The switching unit 604 switches the second earphone to serve as the master earphone and the first earphone to serve as the slave earphone when the difference between the second battery life and the first battery life is greater than the first preset threshold. In this way, when a battery life of the master earphone is shorter than that of the slave earphone, switching between master and slave earphones can be achieved, thereby improving user experience.

In an example, the electronic device pre-stores a mapping relationship set. The mapping relationship set includes multiple first mapping relationships between operating parameters and power consumption rates. In terms of predicting the first battery life of the first earphone according to the first remaining power and the first operating parameter, the first predicting unit 602 is configured to: determine a current application, determine a target first mapping relationship corresponding to the current application according to a preset correspondence relationship between applications and the multiple first mapping relationships, determine a first target power consumption rate corresponding to the first operating parameter according to the target first mapping relationship, and determine the first battery life according to the first remaining power and the first target power consumption rate.

In an example, in terms of predicting the second battery life of the second earphone according to the second remaining power and the second operating parameter, the second predicting unit 603 is configured to: determine a second target power consumption rate corresponding to the second operating parameter according to a preset second mapping relationship between operating parameters and power consumption rates, and determine the second battery life according to the second remaining power and the second target power consumption rate.

In an example, for switching the second earphone to serve as the master earphone and the first earphone to serve as the slave earphone, the switching unit 604 is configured to: disconnect a first data transmission link with the first earphone, and establish a second data transmission link with the second earphone.

In an example, for disconnecting the first data transmission link with the first earphone, and establishing the second data transmission link with the second earphone, the switching unit 604 is configured to: send a first request and a second request to the first earphone, where the first request is used for requesting the first earphone to disconnect the first data transmission link with the electronic device and the second request is used for requesting the first earphone to forward the second request to the second earphone and instructing the second earphone to establish the second data transmission link with the electronic device.

In an example, for disconnecting the first data transmission link with the first earphone, and establishing the second data transmission link with the second earphone, the switching unit 604 is configured to: send a third request to the first earphone, where the third request is used for requesting the first earphone to disconnect the first data transmission link with the electronic device, and send a fourth request to the second earphone, where the fourth request is used for requesting the second earphone to establish the second data transmission link with the electronic device.

Figure 6B:
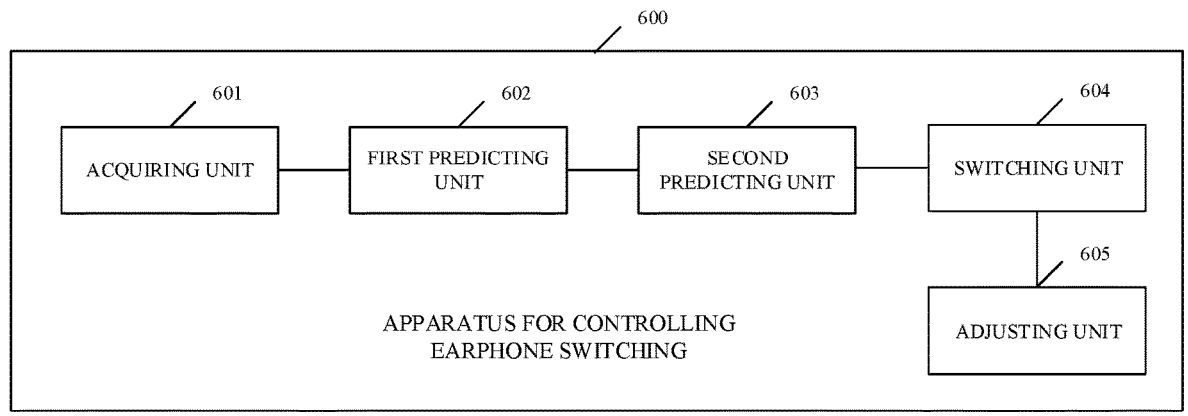
FIG. 6B is another schematic structural diagram illustrating an apparatus for controlling earphone switching according to an implementation of the present disclosure.

In an example, FIG. 6B illustrates a modification of the apparatus for controlling earphone switching illustrated in FIG. 6A. As illustrated in FIG. 6B, compared with the apparatus illustrated in FIG. 6A, an apparatus illustrated in FIG. 6B further includes a adjusting unit 605.

The adjusting unit 605 is configured to adjust the first operating parameter of the first earphone, when the difference between the second battery life and the first battery life is greater than a second preset threshold. The first preset threshold is smaller than the second preset threshold.

Figure 7:
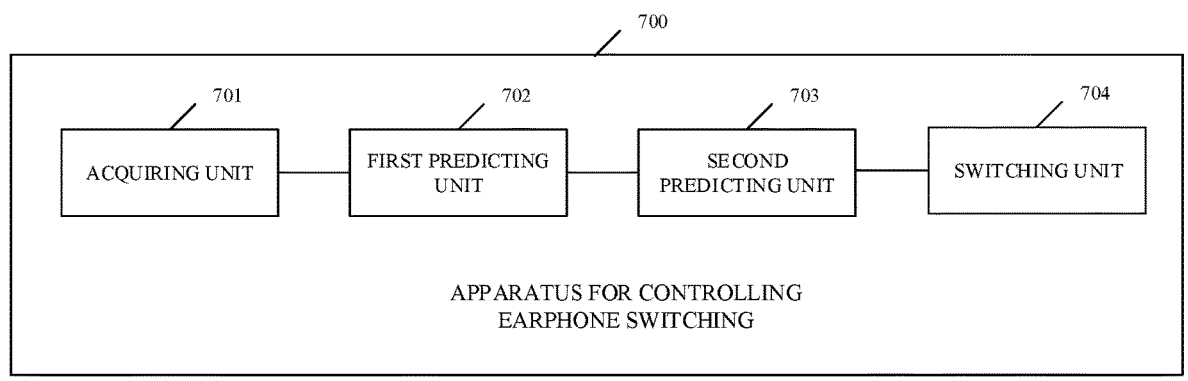
FIG. 7 is a schematic structural diagram illustrating an apparatus for controlling earphone switching according to another implementation of the present disclosure.

FIG. 7 is a schematic structural diagram illustrating an apparatus 700 for controlling switching between master and slave earphones according to another implementation of the present disclosure. The apparatus is applicable to a wireless earphone and the first earphone in the system illustrated in FIG. 1B. The apparatus includes an acquiring unit 701, a first predicting unit 702, a second predicting unit 703, and a switching unit 704.

The acquiring unit 701 is configured to acquire a first remaining power and a first operating parameter of the first earphone and a second remaining power and a second operating parameter of a second earphone.

The first predicting unit 702 is configured to predict a first battery life of the first earphone according to the first remaining power and the first operating parameter.

The second predicting unit 703 is configured to predict a second battery life of the second earphone according to the second remaining power and the second operating parameter.

The switching unit 704 is configured to switch the second earphone to serve as a master earphone and the first earphone to serve as a slave earphone, when a difference between the second battery life and the first battery life is greater than a first preset threshold.

In an example, for switching the second earphone to serve as the master earphone and the first earphone to serve as the slave earphone, the switching unit 704 is configured to: disconnect a first data transmission link with an electronic device, and send a fifth request to the second earphone, where the fifth request is used for requesting the second earphone to establish a second data transmission link with the electronic device.

In an example, for switching the second earphone to serve as the master earphone and the first earphone to serve as the slave earphone, the switching unit 704 is configured to: send a sixth request to the electronic device, and disconnect a first data transmission link with the electronic device, where the sixth request is used for requesting the electronic device to establish a second data transmission link with the second earphone.

The apparatus for controlling earphone switching is applicable to the first earphone. The acquiring unit 601 acquires the first remaining power and the first operating parameter of the first earphone and the second remaining power and the second operating parameter of the second earphone, where the first earphone serves as the master earphone and the second earphone serves as the slave earphone. The first predicting unit 602 predicts the first battery life of the first earphone according to the first remaining power and the first operating parameter. The second predicting unit 603 predicts the second battery life of the second earphone according to the second remaining power and the second operating parameter. The switching unit 604 switches the second earphone to serve as the master earphone and the first earphone to serve as the slave earphone when the difference between the second battery life and the first battery life is greater than the first preset threshold. As such, when a battery life of the master earphone is shorter than that of the slave earphone, switching between master and slave earphones can be achieved, which is possible to improve user experience.

According to implementations of the disclosure, a computer storage medium is further provided. The computer storage medium is configured to store computer programs for electronic data interchange. The computer programs are operable with a computer to perform all or part of the operations of any of the methods described in the foregoing method implementations. "Computer" referred to herein includes an electronic device.

According to implementations of the present disclosure, a computer program product is further provided. The computer program product includes a non-transitory computer readable storage medium configured to store computer programs. The computer programs are operable with a computer to perform all or part of the operations of any of the methods described in the foregoing method implementations. The computer program product may be a software installation package. The computer includes an electronic device.

It is to be noted that, for the sake of simplicity, the foregoing method implementations are described as a series of action combinations. However, it will be appreciated by those skilled in the art that the present disclosure is not limited by the sequence of actions described. The reason is that, according to the present disclosure, certain steps or operations may be executed in other orders or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or assemblies may be combined or may be integrated into another system, or some features may be ignored or not performed. In addition, coupling or communication connection between each illustrated or discussed component may be direct coupling or communication connection, or may be indirect coupling or communication among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, a magnetic disk, a compact disc (CD), or the like.

It will be understood by those of ordinary skill in the art that all or part of the steps of the various methods of the implementations described above may be accomplished by means of a program to instruct associated hardware, and the program may be stored in a computer-readable memory, which may include a flash memory, a ROM, a RAM, a magnetic disk, or a CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for controlling earphone switching, comprising:
    acquiring, by a first earphone, a first remaining power and a first operating parameter of the first earphone and a second remaining power and a second operating parameter of a second earphone, the first earphone being coupled with an electronic device and the second earphone and serving as a master earphone, and the second earphone serving as a slave earphone;
    predicting, by the first earphone, a first battery life of the first earphone according to the first remaining power, the first operating parameter, and a plurality of mapping relationships between operating parameters and power consumption rates pre-stored on the first earphone;
    predicting, by the first earphone, a second battery life of the second earphone according to the second remaining power and the second operating parameter;
    switching, by the first earphone, the second earphone to serve as the master earphone and the first earphone to serve as the slave earphone, when a difference between the second battery life and the first battery life is greater than a first preset threshold; and
    adjusting the first operating parameter of the first earphone, when the difference between the second battery life and the first battery life is greater than a second preset threshold after switching the second earphone to serve as the master earphone, wherein the second preset threshold is greater than the first preset threshold.

2. The method of claim 1, wherein acquiring the second remaining power and the second operating parameter of the second earphone comprises:
    acquiring the second remaining power and the second operating parameter of the second earphone via communication between the first earphone and the second earphone.

3. The method of claim 1, wherein the first earphone pre-stores a correspondence relationship between applications and the plurality of mapping relationships, and wherein predicting the first battery life of the first earphone comprises:
    determining a current application;
    determining a mapping relationship corresponding to the current application according to the correspondence relationship;
    determining a power consumption rate corresponding to the first operating parameter according to the mapping relationship; and
    determining the first battery life according to the first remaining power and the power consumption rate.

4. The method of claim 1, wherein the second earphone pre-stores a mapping relationship between operating parameters and power consumption rates, and wherein
    predicting the second battery life of the second earphone comprises:
        determining a power consumption rate corresponding to the second operating parameter according to the mapping relationship; and
        determining the second battery life according to the second remaining power and the power consumption rate.

5. The method of claim 1, wherein switching the second earphone to serve as the master earphone and the first earphone to serve as the slave earphone comprises:
    disconnecting a first data transmission link with the electronic device, and sending a request to the second earphone, wherein the request is used for requesting the second earphone to establish a second data transmission link with the electronic device.

6. The method of claim 1, wherein switching the second earphone to serve as the master earphone and the first earphone to serve as the slave earphone comprises:
    sending a request to the electronic device, and disconnecting a first data transmission link with the electronic device, wherein the request is used for requesting the electronic device to establish a second data transmission link with the second earphone.

7. The method of claim 1, wherein switching the second earphone to serve as the master earphone and the first earphone to serve as the slave earphone comprises:
    sending a request to the electronic device to request the electronic device to disconnect a first data transmission link with the first earphone and establish a second data transmission link with the second earphone.

8. The method of claim 1, wherein adjusting the first operating parameter comprises at least one of: turning down a volume, reducing power, entering a standby mode, and entering a sleep mode.

9. An earphone, comprising:
    at least one processor; and
    a computer readable storage, coupled to the at least one processor and storing at least one computer executable instruction thereon which, when executed by the at least one processor, causes the at least one processor to carry out actions comprising:
        acquiring a first remaining power and a first operating parameter of the earphone and a second remaining power and a second operating parameter of other earphone, the earphone being configured to be coupled with an electronic device and the other earphone and serving as a master earphone, and the other earphone serving as a slave earphone;
        predicting a first battery life of the earphone according to the first remaining power, the first operating parameter, and a plurality of mapping relationships between operating parameters and power consumption rates pre-stored on the first earphone;

predicting a second battery life of the other earphone according to the second remaining power and the second operating parameter;

switching the other earphone to serve as the master earphone and the earphone to serve as the slave earphone, when a difference between the second battery life and the first battery life is greater than a first preset threshold; and adjusting the first operating parameter of the first earphone, when the difference between the second battery life and the first battery life is greater than a second preset threshold after switching the second earphone to serve as the master earphone, wherein the second preset threshold is greater than the first preset threshold.

10. The earphone of claim 9, wherein the at least one processor configured to carry out the second remaining power and the second operating parameter of the other earphone is configured to carry out actions comprising:

acquiring the second remaining power and the second operating parameter of the other earphone via communication between the earphone and the other earphone.

11. The earphone of claim 9, wherein the earphone pre-stores a correspondence relationship between applications and the plurality of mapping relationships, and wherein the at least one processor configured to carry out predicting the first battery life of the earphone is configured to carry out actions comprising:

determining a current application;

determining a mapping relationship corresponding to the current application according to the correspondence relationship;

determining a power consumption rate corresponding to the first operating parameter according to the mapping relationship; and determining the first battery life according to the first remaining power and the power consumption rate.

12. The earphone of claim 9, wherein the other earphone pre-stores a mapping relationship between operating parameters and power consumption rates, and wherein the at least one processor configured to carry out predicting the second battery life of the other earphone is configured to carry out actions comprising:

determining a power consumption rate corresponding to the second operating parameter according to the mapping relationship; and determining the second battery life according to the second remaining power and the power consumption rate.

13. The earphone of claim 9, wherein the at least one processor configured to carry out switching the other earphone to serve as the master earphone and the earphone to serve as the slave earphone is configured to carry out actions comprising:

disconnecting a first data transmission link with the electronic device, and sending a request to the other earphone, wherein the request is used for requesting the other earphone to establish a second data transmission link with the electronic device.

14. The earphone of claim 9, wherein the at least one processor configured to carry out switching the other earphone to serve as the master earphone and the earphone to serve as the slave earphone is configured to carry out actions comprising:

sending a request to the electronic device, and disconnecting a first data transmission link with the electronic device, wherein the request is used for requesting the electronic device to establish a second data transmission link with the other earphone.

15. The earphone of claim 9, wherein the at least one processor configured to carry out switching the other earphone to serve as the master earphone and the earphone to serve as the slave earphone is configured to carry out actions comprising:

sending a request to the electronic device to request the electronic device to disconnect a first data transmission link with the earphone and establish a second data transmission link with the other earphone.

16. The earphone of claim 9, wherein the at least one processor configured to carry out adjusting the first operating parameter is configured to carry out actions comprising at least one of: turning down a volume, reducing power, entering a standby mode, and entering a sleep mode.

17. An earphone system, comprising a first earphone and a second earphone with only one of them being capable of coupling with an electronic device at a time, the first earphone being currently coupled with the electronic device and the second earphone and comprising:

at least one processor; and a computer readable storage, coupled to the at least one processor and storing at least one computer executable instruction thereon which, when executed by the at least one processor, causes the at least one processor to:

acquire a first remaining power and a first operating parameter of the first earphone and a second remaining power and a second operating parameter of a second earphone;

determine a first battery life of the first earphone according to the first remaining power, the first operating parameter, and a plurality of mapping relationships between operating parameters and power consumption rates pre-stored on the first earphone;

determine a second battery life of the second earphone according to the second remaining power and the second operating parameter;

disconnect a first data transmission link between the first earphone and the electronic device and establish a second data transmission link between the second earphone and the electronic device, when a difference between the second battery life and the first battery life is greater than a first preset threshold; and adjust the first operating parameter of the first earphone, when the difference between the second battery life and the first battery life is greater than a second preset threshold after switching the second earphone to serve as the master earphone, wherein the second preset threshold is greater than the first preset threshold.

* * * * *